April 17, 1951 C. L. HALLER 2,549,461
CONTROL MECHANISM
Filed April 5, 1948 2 Sheets-Sheet 1

INVENTOR
CLAYTON L. HALLER
BY R. J. Eisinger
ATTORNEY

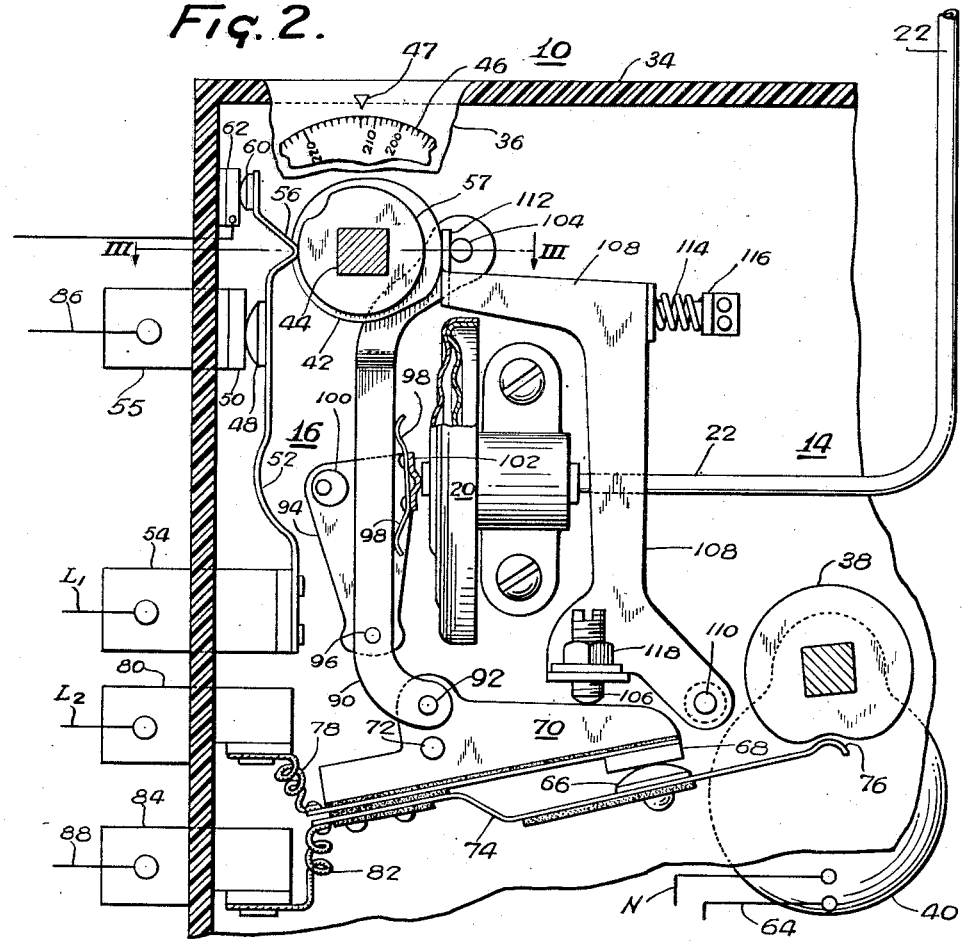
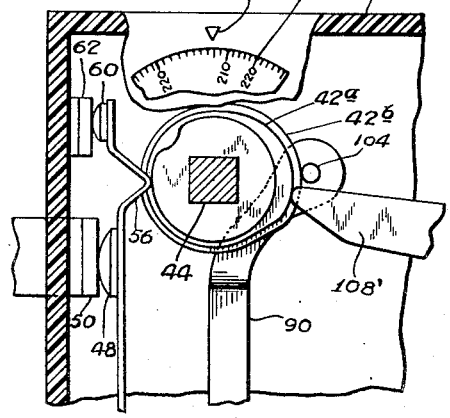
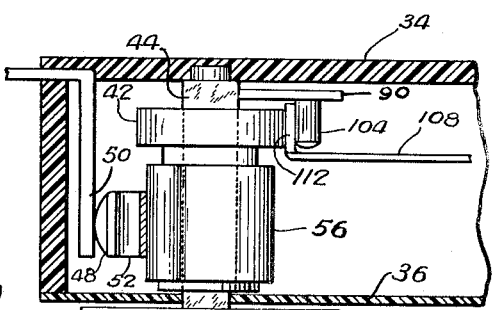

Patented Apr. 17, 1951

2,549,461

UNITED STATES PATENT OFFICE 2,549,461

CONTROL MECHANISM

Clayton L. Haller, Mansfield, Ohio, assignor to Westinghouse Electric Corporation, East Pittsburgh, Pa., a corporation of Pennsylvania Application April 5, 1948, Serial No. 18,892

9 Claims. (Cl. 200—136.3)

This invention relates to an improved thermostatic control mechanism that will regulate automatically the heat output of an electric heating element, such as an electric range surface unit, to maintain the desired temperature of a cooking vessel or other object being heated thereby.

Electric range surface units may be controlled in various ways, one of the most recent types of control mechanisms being a motor driven mechanism in which a constantly rotating cam makes and breaks a pair of switch contacts, thus intermittently energizing the surface unit. This type of control is commonly known as an infinite wattage control, since the "on" and "off" cycle may be infinitely varied from "full on" to "off." That is, the "on" portion of the cycle or impulse may be varied from 100% surface unit output to zero output through an infinite number of fine increments.

In a patent application Serial No. 552,872, of Earl K. Clark, filed September 6, 1944, now Patent No. 2,500,061 granted March 7, 1950, there is shown and described one embodiment of such a control mechanism which automatically regulates the heat output of a heating element or surface unit to maintain a cooking vessel placed thereon at a preselected desired temperature. Clark's invention, briefly stated, makes use of a thermostatic device sensitive to the temperature of a cooking vessel and so constructed and arranged in an infinite wattage control switch as to vary the "on" and "off" cycle as demanded by the vessel in accordance with the preselected cooking temperature. With this arrangement power is continuously supplied to the heating unit until the vessel is brought up to the desired temperature control range, at which time the temperature responsive member, which is disposed at the center of the heating unit in contact with the vessel, causes the power impulse to be shortened progressively until the vessel attains the set temperature. As the vessel attains the set temperature, stored heat within the heating unit will influence the thermostat, abnormally raising its temperature and thereby causing the temperature responsive member to "overshoot" and terminate the power impulse.

I have found that heat stored within the heating unit will maintain the temperature responsive member in circuit opening condition for several revolutions of the cycling cam. This condition is variable and its length of duration is dependent on the amount of stored heat in the heating unit. Without regular power impulses the heating unit cools below the temperature required to maintain the desired temperature of the cooking vessel. When the thermostatic member cools to the temperature setting, the power impulses will be re-initiated. However, time is lost and the cooking operation is delayed, since the heating unit and the vessel must be brought back up to the required temperature.

My invention is an improvement on Clark's device and eliminates the possibility of unduly cooling the heating unit and vessel by providing a means which will insure a minimum power impulse for each revolution of the motor driven cam. I also provide a means for varying this minimum power impulse in accordance with the selected temperature setting. Thus, for high temperature settings the minimum power impulse may be of longer duration than for low temperature settings, since the power input need of a surface unit at a high setting may be greater than the power input need of a surface unit at a low setting to achieve maximum operating efficiency and stability.

To achieve this result, I provide an adjustable stop member which will limit the travel of the thermostatically adjustable contact in circuit opening direction, thereby rendering the thermostatic power impulse controlling means ineffective beyond certain limits as determined by the thermal capacity of the cooking vessel. It will be understood that the minimum impulse for each temperature setting is of such duration as to compensate for most of the heat losses in the vessel and heating unit until the thermostatic actuating member cools sufficiently to initiate a power impulse of longer duration. The adjustable stop member is operatively connected to the control knob, so that when the cooking temperature desired is selected the stop member is automatically positioned, thus eliminating the use of an additional knob.

It is therefore an object of this invention to provide a thermostatic control mechanism of the motor driven intermittently operating type which will insure a power impulse at regular intervals to an electrical heating element, thereby preventing undue cooling of the heating element and the vessel being heated thereby.

A further object is to provide a thermostatic control mechanism of the character described in which the duration of the minimum impulse is variable in accordance with the thermostatic control setting.

These and other objects are effected by the invention as will be apparent from the following description and claims taken in connection with the accompanying drawings, forming a part of this application, in which:

Fig. 2 is a view of the control shown in Fig. 1, but with the adjustable stop acting to provide a minimum power impulse;

Fig. 3 is a section taken on line III—III of Fig. 2 with some parts omitted, and Fig. 4 is a fragmentary diagrammatic view showing a variation of the embodiment shown in Fig. 1.

Figure 1:
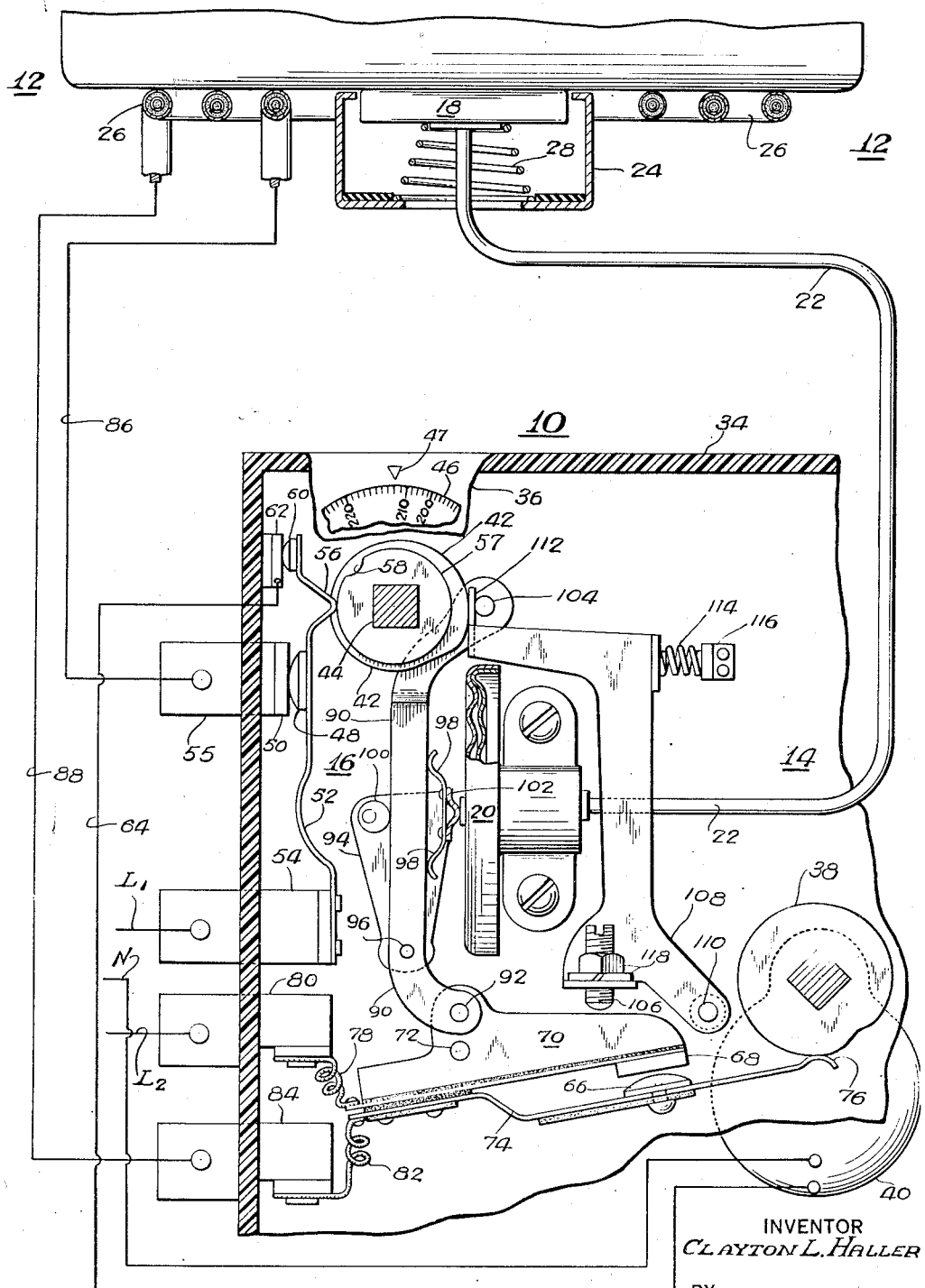
Fig. 1 is a diagrammatic view of my improved control.

Referring to the drawings, there is shown a control generally designated 10 operatively connected to an electrical surface heating unit 12. This control includes a thermal or hydraulic system 14 and a switch mechanism 16. The hydraulic system, including a thermostatic bulb or chamber 18, an expansible chamber or hydraulic switch-actuating member 20, and capillary tubing 22 connecting the bulb 18 and the expansible chamber 20, is filled with a suitable liquid that is non-vaporizable at cooking temperatures. The expansible chamber 20, also referred to as a wafer or diaphragm, comprises two flexible discs or diaphragm members providing the expansible chamber therebetween. Disposed circumferentially around the bulb 18 is a heat baffle 24 which provides an obstruction to flow of heat from a sheathed heating element 26. This baffle may also serve to support a spring 28 which biases the bulb against the lower surface of a vessel placed on the heating unit, in order to provide good heat conduction therebetween.

The switch mechanism 16 is disposed in a housing 34 having a cover 36 which may house a plurality of other controls if desired as is well known in the art. A continuously rotating, cycling cam 38, driven through reduction gearing (not shown) by a motor 40 mounted on the back of the housing 34, may be common to and serve several controls if desired.

The switch mechanism includes a manually adjustable temperature setting cam 42 mounted on a rotatable shaft 44. A knob 46 is mounted on a portion of the shaft 44 which extends to the exterior of the cover 36, and may be graduated in degrees of temperature maintained in an average vessel containing food when the knob is turned to the position bearing such indicia. A dart or mark 47 may be inscribed on the housing cover adjacent the knob 46 to provide a temperature setting reference point. In addition the knob has an "off" position, in which the contacts are in open position.

The switch mechanism 16 is a two-pole switch. One pole comprises contacts 48 and 50 for opening one side of the line in the "off" position of the knob. The contact 48 is carried on a flexible switch arm 52 fixed at one end to a terminal 54; while the stationary contact 50 is carried by a terminal 55. The switch arm is bent to form a cam follower 56 engaging the surface of a cam 57 mounted on the shaft 44 in front of the cam 42. The cam 57 is formed with a recess 58 to permit the switch arm 52 to move the contact 48 to open position when the knob 46 is turned to its "off" position. In all other positions, the cam 57 holds the switch arm 52 in closed circuit position. The switch arm 52 also carries a contact 60 engageable with a stationary contact 62 connected to the motor 40 by a conductor 64. As will be apparent, contacts 60 and 62 are engaged simultaneously with engagement of the contacts 48 and 50 at all times that the knob is moved away from its "off" position.

The other pole of the switch 16 comprises a pair of abutting contacts 66 and 68 which regulate the average wattage input to the heating element 26. These contacts also serve as a line switch to open the other side of the line in the "off" position. The contact 68 is mounted on but electrically insulated from a bracket or lever 70 pivoted on a pivot pin 72 carried by the housing 34. The contact 66 is mounted on a spring arm 74, one end of which is fastened to but electrically insulated from the lever 70. Thus the contacts 66 and 68 are both carried by the lever 70. The other end of the spring arm 74 is extended and formed to provide a cam follower 76 adapted to engage the surface of the cam 38, thereby to move the contact 66 up and down periodically, as will be further described.

The contact 68 is connected through a flexible lead 78 to a terminal 80, while the contact 66 is connected through a flexible lead 82 to a terminal 84. The terminals 54 and 80 are connected to a suitable source of electric current, such as the line conductors $L_1$ and $L_2$ which provide a substantially constant voltage, such as 220 volts. The terminals 55 and 84 are connected through leads 86 and 88, respectively, to the opposite terminals of the heating element 26. There is thus provided a complete circuit through the heating element 26 which is traced as follows: conductor $L_1$, terminal 54, switch arm 52, contacts 48 and 50, terminal 55, lead 86, heating element 26, lead 88, terminal 84, lead 82, arm 74, contacts 66 and 68, lead 78, terminal 80 and conductor $L_2$. The circuit for the motor is traced from the conductor $L_1$, through the arm 52, contacts 60 and 62, lead 64, through the motor 40 to a neutral conductor N, which conductors provide 110 volts.

The lever 70 is positioned by the lower end of a lever 90, being connected thereto by a pivot pin 92. The lever 90 is provided with an arm 94 pivoted thereto by a pivot pin 96. The arm 94 is normally in fixed relation to lever 90 and the two members, therefore, act as a single lever in normal operation. A spring 98 biases the lever 90 against an adjustable eccentric stop pin 100 carried by the arm 94, so relief is provided by the flexibility of the spring under a condition which will be explained later.

The arm 94 is provided with an abutment 102 which is adapted to abut and to be actuated by the wafer 20. The lever 90 is provided at its upper end with a pin 104 which is adapted to be actuated by the manually-adjustable cam 42 and thereby position the lever.

A stop member or screw 106 is carried by an inverted L-shaped lever 108 pivotally connected to the housing 34 by a pivot pin 110. This stop member is disposed above the lever 70 and is adapted to limit the upward travel thereof by abutment. The lever 108 has its upper end formed to provide a follower tip 112 which bears against the periphery of the manually-operable cam 42. It may now be noted that lever pin 104 abuts the follower tip 112 so that both levers 90 and 108 are moved simultaneously by movement of the manual cam 42. A compression spring 114 anchored to the housing 34 by a bracket 116 serves to bias the lever 108 against the cam 42. The stop screw 106 is locked to the lever 108 by a lock-washer and nut 118. This arrangement also provides a calibration adjustment which may be effected by loosening the nut 118, rotating the stop screw 106 to the desired position and re-tightening the nut. Backing the screw 106 out of the lever 108 will reduce the minimum power impulse since the lever 70 will travel further before being restrained by the screw. Conversely, the minimum power impulse may be increased by advancing the screw 106 through the lever 108.

Operation

To initiate a cooking operation the knob 46 is rotated clockwise until the indicium corresponding to the temperature desired for cooking is aligned with the dart 47. Both cams 42 and 57 will be rotated simultaneously by the knob shaft 44. Cam 57 will move the switch arm 52 to the left closing electrical contacts 60 and 62 and 48 and 50 to energize the circuits through the heater 26 and the motor 40 as previously described in this specification. Cam 42 will move the upper ends of the levers 90 and 108 to the left. The movement of lever 108 will adjust the position of the stop screw 106 in accordance with the temperature setting. The movement of lever 90 will have an immediate effect upon the contact carrying lever 70, moving it clockwise to a lower position. In this position the cam follower 76 will be out of engagement with the surface of the cycling cam 38 and contacts 66 and 68 will be in uninterrupted engagement providing a continuous circuit through the heating element 26.

As the cooking vessel becomes increasingly heated, the liquid within the bulb 18 will be heated accordingly and expand the wafer 20, moving lever 90 to the left about the cam follower pin 104 as a center and moving lever 70 in counterclockwise direction. The cam follower 76 will be raised to abut the cycling cam and will be moved up and down in a cycling motion, making and breaking the circuit through contacts 66 and 68. As the vessel attains the preselected temperature, the wafer will expand further until theoretically a point of equilibrium is reached and the lever 70 is so positioned that the "on" period of the heating cycle is just sufficient to replace the heat losses and maintain the selected temperature setting. In actual practice this is not the case, since the thermal system, although being responsive to the vessel temperature primarily, receives stored heat from the heating unit. The most severe "overshooting" of the thermal system occurs when the cooking operation is initially brought up to temperature. Since the thermostat is relatively cool, full wattage is delivered by the heating unit. Consequently, when the selected temperature is attained the stored heat is excessive. In subsequent cycling the "overshooting" is reduced, since the stored heat is not as great. This stored heat causes "overshooting" of the thermal system and results in excessive movement of the lever 90 to the left. The lever 70 thus would be raised to such a position that contacts 66 and 68 might not make with each other for several revolutions of the cam 38 or, in other words, for the amount of time necessary for the thermal system to cool sufficiently to retract the wafer 20. Without periodic power impulses to replace heat radiation, the vessel temperature would drop below the selected temperature before the thermal system cooled sufficiently to permit cycling of the contacts 66 and 68, thereby causing loss of time and reduced cooking efficiency.

As shown in Fig. 2, the stop pin 106 is so positioned by the lever 108 that when the thermal system "overshoots" as explained above, the lever 70 will abut thereon and be prevented from moving further in the direction urged by the expanding wafer 20. As the contact-carrying follower 76 rides on the cam, the contacts 66 and 68 will "make" for a prescribed portion of the cam cycle as determined by the calibration of the stop pin. To prevent damage to the lever 90 when the lever 70 is against the stop pin 106, the lever 94 is provided. The spring 98 on this lever is unyielding under normal operation but when further travel is opposed by the stop pin the spring compresses under the expansive thrust of the wafer 20 providing relief to the linkage.

Since levers 90 and 108 are both actuated by the manual cam 42 it will be understood that the position of the stop pin is definitely related to the cut-off position of lever 70. As the cam 42 is rotated to a higher temperature position (determined by decrease in throw of the cam), the stop pin 106 is lowered accordingly to increase the minimum impulse period per cycle of the rotating cam 38. This feature is especially important since the higher the temperature setting, the longer the minimum energy impulse must be to replace the greater heat losses of the vessel.

This invention is susceptible of various modifications, another embodiment being illustrated in Fig. 4 in which two manually adjustable, lever positioning cams 42a and 42b are used instead of cam 42. A large portion of the control is not shown in this embodiment since it may be the same as that shown in Figs. 1, 2 and 3 as already described. The cams 42a and 42b are carried by the shaft 44 and are jointly rotatable therewith. The lever 90 is movable by the cam 42b, engagement between the lever and cam being effected by the pin 104 attached to the upper end of the lever. A lever 108', similar to the lever 108 which positions the stop pin 106, has its upper end portion abutting and acting as a follower to cam 42a. The contour of the cams 42a and 42b may be of dissimilar shapes as desired, providing unassociated movements of the levers 90 and 108'. The position of the stop pin 106 at various temperature settings may thus be determined without in any way affecting the determination of the position of lever 90.

Although provision for a minimum impulse throughout the entire cooking temperature range may be made, I find it especially advantageous in the boiling or vegetable cooking range. The provision of a separate cam such as cam 42a permits an arrangement whereby a minimum wattage impulse may be provided within the boiling range alone, if so desired. The minimum wattage impulse may be set to maintain steady boiling in a small cooking vessel. Although this minimum impulse may not be sufficient to maintain steady boiling in the event that a large cooking vessel is used, its effect will be to notably improve the temperature control and minimize excess temperature drop in the vessel as previously explained.

While I have shown my invention in several forms, it will be obvious to those skilled in the art that it is not so limited, but is susceptible of various changes and modifications without departing from the spirit thereof.

What I claim is:

1. An adjustable temperature-responsive control comprising a control knob adapted to be set to a preselected temperature control setting, means comprising a lever for varying an energy supply, said means operating to provide successively lower rates of energy supply upon movement of said lever in one direction and to provide successively higher rates of energy supply upon movement of said lever in the opposite direction, a thermostat operable to actuate said lever in response to change in temperature, a stop member adapted to act on said lever to limit its travel in energy reducing direction to provide a desired minimum rate of energy supply, and mechanism operable by said knob for positioning said stop.

2. An adjustable temperature-responsive control comprising a control knob adapted to be set to a preselected temperature control setting, a pair of electrical contacts, a motor-actuated cam adapted to move one of said contacts to intermittently open and close said contacts, a lever adjusted by said knob and adapted to adjust said contacts to vary the contact closing period, a thermostat member operable to adjust the lever as necessary to attain and maintain said preselected temperature, said lever having a range of travel sufficient to adjust said contacts to a continuously open position, and a stop member adapted to limit the movement of the lever in contact opening direction when the thermostat exceeds the preselected temperature, said stop member being adjustable to provide a desired flow of current when said thermostat member is above said preselected temperature.

3. The structure recited in claim 2 and further including a second cam, said second cam being movable by said knob to position said stop member.

4. The structure recited in claim 2 and further including a cam operated by said control knob, said cam being adapted to move said lever and said stop member to predetermined positions in accordance with said knob setting.

5. An adjustable condition-responsive control comprising a condition-responsive device, means comprising a lever actuated by said condition-responsive device for varying a power supply in response to variation in a physical condition, said means operating to provide successively lower rates of power supply upon movement of said lever in one direction and to provide successively higher rates of power supply upon movement of said lever in the opposite direction, an adjusting knob operable to adjust the control to a preselected condition control setting, a stop member for limiting the movement of the lever and thereby rendering it ineffective to completely shut off the power supply when the condition-responsive device exceeds the preselected condition, and mechanism including a cam and a follower actuated by said control knob and adapted to adjustably position said stop member to thereby provide a desired flow of power when said condition-responsive device is above said preselected condition.

6. An adjustable condition-responsive control comprising a pair of electrical contacts, a motor-actuated cam adapted to intermittently open and close said contacts, a lever for adjusting said contacts to vary the contact closing period, a device operable to change the position of said lever in response to variation in a physical condition, said lever having a range of travel sufficient to adjust said contacts to a continuously open position, an adjusting knob operable to adjust the control to vary the relation of the period of contact closing to the value of said physical condition, and a stop member adapted to limit the movement of the lever by said device in contact opening direction, the position of said stop member being adjustable to provide a desired minimum contact closing period when said device exceeds said physical condition.

7. An adjustable condition-responsive control comprising a pair of electrical contacts, a motor-actuated cam adapted to intermittently open and close said contacts, a lever adapted to adjust said contacts to vary the contact closing period, a device operable to change the position of said lever in response to variation in a physical condition, said lever having a range of travel sufficient to adjust said contacts to a continuously open position, an adjusting knob operable to adjust the relation of the period of contact closing to the value of said physical condition, and a stop member adapted to limit the movement of the lever by said device in contact opening direction, the position of said stop member being adjustable by said control knob to provide a desired minimum contact closing period in accordance with the position of the control knob.

8. An adjustable temperature-responsive control comprising energy varying means operable to provide several different rates of energy supply below the maximum rate, a thermostatic member operable to adjust said means to provide increase from one rate of energy supply to a higher rate of energy supply in response to decrease in temperature and decrease from one rate of energy supply to a lower rate of energy supply in response to increase in temperature, an adjusting knob operable to adjust the control to vary the relation of the energy varying means with respect to said thermostatic member, and a stop member adapted to act on said energy varying means to limit its movement in energy reducing direction, said stop member being adjustable by said knob to provide a desired minimum energy in accordance with the position of the knob.

9. An adjustable temperature-responsive control comprising a pair of cooperating electrical contacts, means for cyclically opening and closing said contacts, means including an adjustable control element for decreasing the ratio of the "on" period to the "off" period upon movement of the control element in one direction and for increasing said ratio upon movement of the control element in the opposite direction, temperature-responsive means for moving said control element in said first direction upon increase in temperature and in said other direction upon decrease in temperature, means including a manually actuated knob for adjusting the control to vary the temperature setting thereof, and means including a cam operated by said knob and a stop member positioned by said cam for limiting the movement of said control element in said first direction to provide at least a minimum ratio of "on" period to "off" period which is dependent upon the adjustment of said knob but independent of said temperature-responsive means.

CLAYTON L. HALLER.

REFERENCES CITED

The following references are of record in the file of this patent:

UNITED STATES PATENTS

| Number | Name | Date |
|---|---|---|
| 1,852,102 | Bast et al. | Apr. 5, 1932 |
| 2,128,869 | Winborne | Aug. 30, 1938 |
| 2,207,634 | Myers et al. | July 9, 1940 |
| 2,224,983 | Parkhurst | Dec. 17, 1940 |
| 2,258,258 | Mikeska | Oct. 7, 1941 |
| 2,295,298 | Sharp | Sept. 8, 1942 |
| 2,445,021 | Clark | July 13, 1948 |